US009961341B2

(12) United States Patent
Zhu et al.

(10) Patent No.: US 9,961,341 B2
(45) Date of Patent: May 1, 2018

(54) METHOD AND DEVICE FOR EVALUATING CROSSTALK IN NAKED-EYE STEREOSCOPIC DISPLAY

(71) Applicant: BOE TECHNOLOGY GROUP CO., LTD., Beijing (CN)

(72) Inventors: Jinye Zhu, Beijing (CN); Wang Hu, Beijing (CN); Yanbing Wu, Beijing (CN); Wei Wei, Beijing (CN); Shengbao Dun, Beijing (CN); Heliang Di, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 633 days.

(21) Appl. No.: 14/405,313

(22) PCT Filed: Apr. 25, 2014

(86) PCT No.: PCT/CN2014/076270
§ 371 (c)(1),
(2) Date: Dec. 3, 2014

(87) PCT Pub. No.: WO2015/014139
PCT Pub. Date: Feb. 5, 2015

(65) Prior Publication Data
US 2016/0277731 A1   Sep. 22, 2016

(30) Foreign Application Priority Data

Jul. 31, 2013  (CN) .......................... 2013 1 0329433

(51) Int. Cl.
*H04N 17/00*   (2006.01)
*H04N 13/04*   (2006.01)

(52) U.S. Cl.
CPC ....... *H04N 17/004* (2013.01); *H04N 13/0402* (2013.01); *H04N 13/0404* (2013.01);
(Continued)

(58) Field of Classification Search
CPC .................................................. H04N 17/004
See application file for complete search history.

(56) References Cited

U.S. PATENT DOCUMENTS

| 2012/0050498 A1 | 3/2012 | Jung et al. |
| 2014/0035907 A1* | 2/2014 | Hasegawa ................ G09G 5/14 345/419 |
| 2016/0195731 A1* | 7/2016 | Murao ............... H04N 13/0409 349/15 |

FOREIGN PATENT DOCUMENTS

| CN | 102122075 A | 7/2011 |
| CN | 102263985 A | 11/2011 |

(Continued)

OTHER PUBLICATIONS

Chinese Office Action regarding Application No. 2013103294337 dated Oct. 30, 2014. Translation provided by Dragon Intellectual Property Law Firm.
(Continued)

*Primary Examiner* — Jamie Atala
*Assistant Examiner* — Hesham Abouzahra
(74) *Attorney, Agent, or Firm* — Harness, Dickey & Pierce, P.L.C.

(57) ABSTRACT

The present disclosure discloses a method for evaluating crosstalk in a naked-eye stereoscopic display, including: controlling a display panel to display sequentially viewpoint images; when displaying each of the viewpoint images, each of sub-pixels for displaying a current viewpoint image displays a white image, each of sub-pixels for displaying other viewpoint images displays a black image; obtaining sequentially, on a light emitting side of the display panel, first luminance values of light at respective test angles corresponding to the current viewpoint image; controlling the display panel to display an all-black image, obtaining sequentially second luminance values of light at the respec-
(Continued)

tive test angles; determining a crosstalk value of light at one test angle corresponding to any one of luminance peaks in the first luminance values, according to the one of luminance peaks and one second luminance value at the same test angle corresponding to the one of the luminance peaks.

10 Claims, 6 Drawing Sheets

(52) U.S. Cl.
CPC ....... *H04N 13/045* (2013.01); *H04N 13/0413* (2013.01); *H04N 13/0422* (2013.01); *H04N 13/0425* (2013.01)

(56) References Cited

FOREIGN PATENT DOCUMENTS

| | | |
|---|---|---|
| CN | 102724545 A | 10/2012 |
| CN | 103024436 A | 4/2013 |
| CN | 103051919 A | 4/2013 |
| CN | 103414912 A | 11/2013 |

OTHER PUBLICATIONS

International Search Report and Written Opinion dated Aug. 4, 2014 regarding PCT/CN2014/076270. Translation provided by Dragon Intellectual Property Law Firm.

\* cited by examiner

METHOD AND DEVICE FOR EVALUATING CROSSTALK IN NAKED-EYE STEREOSCOPIC DISPLAY

CROSS-REFERENCE TO RELATED APPLICATION

This application is the U.S. national phase of PCT Application No. PCT/CN2014/076270 filed on Apr. 25, 2014, which claims priority to Chinese Patent Application No. 201310329433.7 filed on Jul. 31, 2013, the disclosures of each are incorporated in their entirety by reference herein.

TECHNICAL FIELD

The present disclosure relates to a technical field of displaying images, in particular to a method and a device for evaluating crosstalk in a naked-eye stereoscopic display.

BACKGROUND

Currently, a naked-eye 3D display in a three-dimensional (3D) stereoscopic display technology has been concerned.

A principle of the naked-eye 3D display is shown in FIG. 1. A display device at least includes a display panel 200 and an optical grating 100 located on a light emitting side of the display panel 200. The optical grating 100 may gather light emitted from the display panel 200 to its focus, so that light emitted from left-eye pixels of the display panel 200 is emitted towards a viewer's left eye, and light emitted from right-eye pixels is emitted towards the viewer's right eye, thereby to achieve a 3D display effect.

For the naked-eye 3D display, what is most concerned about is stereoscopic display effect. Viewing regions on the light emitting side of the display device are right-eye viewing regions and left-eye viewing regions arranged at intervals. When human eyes are located in two adjacent right-eye viewing region and left-eye viewing region, a stereoscopic image may be seen. However, since that an arrangement between an optical grating and a test angle cannot be absolutely precise, the naked-eye 3D image display containing 2D (two-dimensional) stray light is resulted, thereby causing some crosstalk problems in the naked-eye 3D display and seriously affecting the naked-eye image display effect.

In general, crosstalk in the naked-eye 3D stereoscopic display is evaluated by being perceived by human eyes, which cannot accurately evaluate crosstalk in the naked-eye stereoscopic display. Until present, effective solutions have not been proposed yet to solve the problem of accurately measuring a crosstalk value in the naked-eye 3D display, to objectively and accurately evaluate the crosstalk in the naked-eye 3D display.

SUMMARY

Embodiments of the present disclosure provide a method and a device for evaluating crosstalk in a naked-eye stereoscopic display, to improve accuracy of evaluating crosstalk in the naked-eye stereoscopic display.

To achieve the above object, the method for evaluating crosstalk in a naked-eye stereoscopic display, includes following steps of:

controlling a display panel to display sequentially N viewpoint images;

when displaying each of the viewpoint images, each of sub-pixels for displaying a current viewpoint image displays a white image, each of sub-pixels for displaying other viewpoint images displays a black image, obtaining sequentially, on a light emitting side of the display panel, corresponding first luminance values of light at respective test angles when displaying the current viewpoint image, and determining luminance peaks in all of the obtained first luminance values;

controlling the display panel to display an all-black image, obtaining sequentially, on the light emitting side of the display panel, corresponding second luminance values of light at the respective test angles when displaying the all-black image;

determining a crosstalk value of light at one test angle corresponding to any one of the luminance peaks in the first luminance values, according to the one of the luminance peaks and one second luminance value at the same test angle corresponding to the one of the luminance peaks;

wherein N is a positive integer not less than 2.

Optionally, the obtaining sequentially, on a light emitting side of the display panel, corresponding first luminance values of light at respective test angles when displaying a current viewpoint image, includes:

at the respective test angles, obtaining first luminance values of light emitted by the respective sub-pixels for displaying the current viewpoint image, on an arc which takes a center of the display panel as its circle center and takes a set distance as its radius and which is located on a same horizontal plane on the light emitting side of the display panel.

Optionally, the first luminance values and the second luminance values of light at the respective test angles are obtained by:

establishing a first luminance curve according to the first luminance values of light obtained at the respective test angles when the display panel displays the respective viewpoint images;

establishing a second luminance curve according to the second luminance values of light obtained at the respective test angles when the display panel displays the all-black image.

Optionally, the determining a crosstalk value of light at one test angle corresponding to any one of the luminance peaks in the first luminance values, according to the one of the luminance peaks and one second luminance value at the same test angle corresponding to the one of the luminance peaks, includes:

determining a crosstalk value of light at an i-th test angle according to a formula:

$$PCT_i = \frac{\sum_{j=1}^{N} Y_{ji} - L_i - (N-1)M_i}{L_i - M_i} \times 100\%;$$

where, $PCT_i$ is the crosstalk value of light at the i-th test angle on the display panel; $L_i$ is the luminance peak in the first luminance values corresponding to the respective viewpoint images at the i-th test angle; $M_i$ is the second luminance value at the i-th test angle; $Y_{ji}$ is the first luminance value of a j-th viewpoint image at the i-th test angle; N is the total number of the viewpoint images.

Optionally, after the determining a crosstalk value of light at one test angle corresponding to any one of the luminance peaks, the method further includes:

establishing a curve of crosstalk values varying with the test angles, according to crosstalk values of light at test angles corresponding to the respective luminance peaks.

One embodiment of the present disclosure provides a device for evaluating crosstalk in a naked-eye stereoscopic display, including:

a luminance obtaining unit, configured to, when each of N viewpoint images is displayed sequentially on a display panel, obtain sequentially, on a light emitting side of the display panel, corresponding first luminance values of light at respective test angles when displaying a current viewpoint image; and when an all-black image is displayed on the display panel, obtain sequentially, on the light emitting side of the display panel, corresponding second luminance values of light at the respective test angles when displaying the all-black image; wherein N is a positive integer not less than 2;

a luminance peak determining unit, configured to determine luminance peaks in all the obtained first luminance values;

a crosstalk value determining unit, configured to determine a crosstalk value of light at one test angle corresponding to any one of the luminance peaks in the first luminance values, according to the one of the luminance peaks and one second luminance value at the same test angle corresponding to the one of the luminance peaks.

Optionally, the luminance obtaining unit is configured to, at the respective test angles, obtain first luminance values of light emitted by respective sub-pixels for displaying the current viewpoint image, on an arc which takes a center of the display panel as its circle center and takes a set distance as its radius and which is located on a same horizontal plane on the light emitting side of the display panel.

Optionally, the device further includes:

a curve establishing unit, configured to establish a first luminance curve according to the first luminance values of light obtained at the respective test angles when the display panel displays the respective viewpoint images; and establish a second luminance curve according to the second luminance values of light obtained at the respective test angles when the display panel displays the all-black image.

Optionally, the crosstalk value determining unit is configured to determine a crosstalk value of light at an i-th test angle according to a formula:

$$PCT_i = \frac{\sum_{j=1}^{N} Y_{ji} - L_i - (N-1)M_i}{L_i - M_i} \times 100\%;$$

where, $PCT_i$ is the crosstalk value of light at the i-th test angle on the display panel; $L_i$ is the luminance peak in the first luminance values corresponding to the respective viewpoint images at the i-th test angle; $M_i$ is the second luminance value at the i-th test angle; $Y_{ji}$ is the first luminance value of a j-th viewpoint image at the i-th test angle; N is the total number of the viewpoint images.

Optionally, the curve establishing unit is further configured to, after determining a crosstalk value of light at one test angle corresponding to any one of the luminance peaks, establish a curve of the crosstalk values varying with the test angles, according to the crosstalk values of light at the test angles corresponding to the respective luminance peaks.

The method and the device for evaluating crosstalk in the naked-eye stereoscopic display provided in embodiments of the present disclosure may accurately measure the crosstalk value in the naked-eye 3D display and objectively and accurately evaluate crosstalk degrees in the naked-eye 3D display, by determining first luminance values of the all-white image and second luminance values of the all-black image.

DETAILED DESCRIPTION

Figures 1, 2:
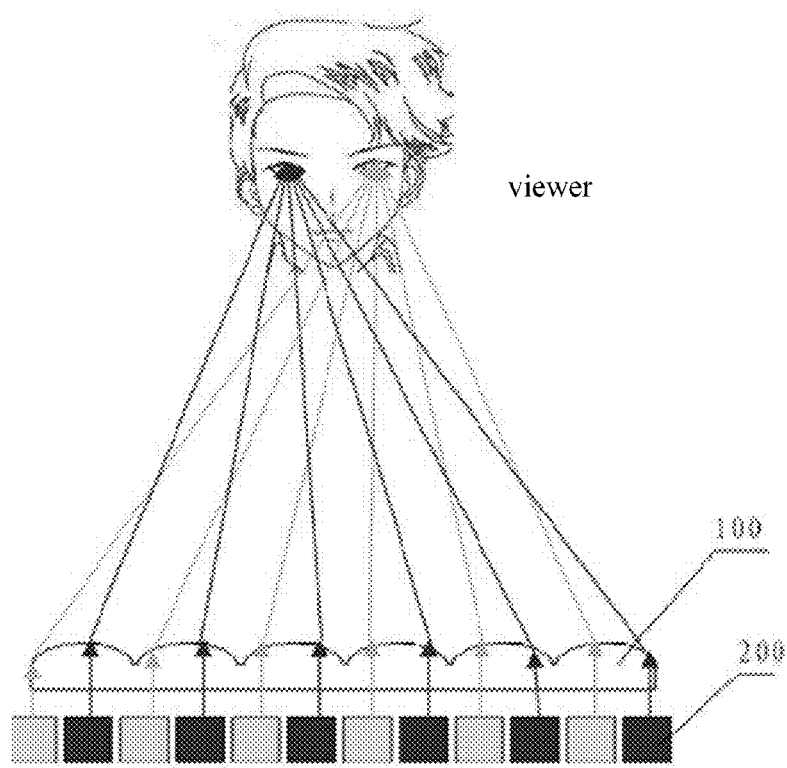
FIG. 1 is a schematic diagram showing a structure of an existing naked-eye 3D display device.
FIG. 2 is a schematic diagram showing an arrangement of sub-pixels on a display panel according to one embodiment of the present disclosure.

Embodiments of the present disclosure provide a method and a device for evaluating crosstalk in a naked-eye stereoscopic display, to improve the accuracy of evaluating crosstalk in the naked-eye stereoscopic display.

In the present disclosure, a display panel is controlled to sequentially display a plurality of viewpoint images and an all-black image. Specifically, first luminance values of light at a plurality of test angles are obtained sequentially when displaying each of the viewpoint images, and second luminance values of light at the plurality of test angles are obtained sequentially when displaying an all-black image on the display panel. Luminance peaks of the first luminance values corresponding to respective viewpoint images are determined, and crosstalk values of light at the test angles where the respective luminance peaks are disposed is determined. Accuracy of determining crosstalk values in the naked-eye 3D display by the above method is high, so that crosstalk degrees in the naked-eye 3D display may be objectively and accurately evaluated.

Each of the luminance peaks corresponds to an optimum viewing angle on a light emitting side of the display panel, that is, each of the luminance peaks is a luminance value obtained at the optimum viewing angle on the light emitting side. Different optimum viewing angles described by the present disclosure correspond to different viewing regions on the light emitting side of the display panel in a one-to-one manner.

The technical solution provided by embodiments of the present disclosure will be described below in detail in conjunction with the accompanying drawings.

A method for evaluating crosstalk in a naked-eye stereoscopic display provided by one embodiment of the present disclosure generally includes the following steps.

Step S101: controlling a display panel to display sequentially N viewpoint images, obtaining sequentially, on a light emitting side of the display panel, first luminance values of light at respective test angles and corresponding to a current viewpoint image, and determining luminance peaks.

Specifically, when displaying each of the viewpoint images, each of the sub-pixels for displaying the current viewpoint image displays white images, each of the sub-pixels for displaying other viewpoint images displays black images; the first luminance values of light at respective test angles and corresponding to the current viewpoint image are sequentially obtained on the light emitting side of the display panel, and the luminance peaks in all of the first luminance values are determined.

Step S102: controlling the display panel to display an all-black image, obtaining sequentially, on the light emitting side of the display panel, second luminance values of light at the respective test angles.

Step S103: determining a crosstalk value of light at one test angle corresponding to any one luminance peak in the first luminance values, according to the one luminance peak and one second luminance value at the same test angle corresponding to the one luminance peak.

N is a positive integer not less than 2.

In one embodiment of the present disclosure, there is no need to limit the sequence of the step S101 and the step S102, that is, the sequence of the step S101 and the step S102 may be interchanged.

It should be noted that each of the viewpoint images corresponds to a part of sub-pixels on the display panel, while all the viewpoint images correspond to all the sub-pixels on the display panel. When the display panel is controlled to display a certain viewpoint image, each of the sub-pixels corresponding to the current viewpoint image displays white images, all other sub-pixels display black images.

Optionally, a crosstalk value of light at the i-th test angle may be determined according to the following formula:

$$PCT_i = \frac{\sum_{j=1}^{N} Y_{ji} - L_i - (N-1)M_i}{L_i - M_i} \times 100\%;$$

where, $PCT_i$ is the crosstalk value of light at the i-th test angle on the display panel; $L_i$ is the luminance peak in the first luminance values corresponding to the respective viewpoint images at the i-th test angle; $M_i$ is the second luminance value at the i-th test angle; $Y_{ji}$ is the first luminance value of the j-th viewpoint image at the i-th test angle; N is the total number of the viewpoint images.

The method for obtaining the first luminance values and the second luminance values respectively according to the steps S101 and S102 will be described below in detail.

In an implementation process, with respect to each of the viewpoint images, first luminance values of light at different test angles $\alpha_1, \alpha_2 \ldots \alpha_m$, are sequentially measured on the light emitting side of the display panel by using an optical test equipment; the first luminance values of light at different test angles may specifically, but be not limited to, be obtained by a luminance meter. An interval step length may be set to measure the first luminance values of light at the plurality of test angles; for example, the first luminance values of light may be measured at an interval of an angle of 0.5 radians.

Similarly, the second luminance values of light at the respective test angles are sequentially measured on the light emitting side of the display panel by using the optical test equipment when the display panel displays the all-black image.

Optionally, in order to improve the accuracy of evaluating crosstalk in the naked-eye stereoscopic display, the luminance meter is moved in a plane, so as to measure luminance values of light at different test angles on the same plane.

Specifically, since right and left eyes of a person are at the same level, thus, the accuracy of evaluating crosstalk in the naked-eye stereoscopic display may be improved by obtaining the luminance values of light at different test angles on the same plane by the luminance meter, relative to a stationary display panel. In the implementation process, the luminance meter may be placed at a position with a constant distance from the ground and on the light emitting side of the display panel, so that the luminance meter may be moved in the same plane to measure luminance values at the plurality of test angles of each of the viewpoint images.

Optionally, in order to further improve the accuracy of evaluating crosstalk in the naked-eye stereoscopic display, luminance values at the plurality of test angles of each of the viewpoint images may be measured by the luminance meter, on the light emitting side of the display panel, at the plurality of test angles on an arc which takes a center of the display panel as its circle center and takes a set distance of watching images as its radius and which is located on the same horizontal plane.

Theoretically, since there is some loss of light in the process of propagation, thus there is some deviation between the luminance values of light at different positions in a same test angle direction. Specifically, the farther away from a light source a position is, the smaller a luminance value of light at the position is; the closer to the light source a position is, the greater a luminance value of light at the position is. In the present disclosure, the luminance values of light are measured by the luminance meter at positions equidistant from the center of the display screen in different test angle directions, so that the accuracy of evaluating crosstalk in the naked-eye stereoscopic display may be improved.

In order to further improve the accuracy of evaluating crosstalk in the naked-eye stereoscopic display, different positions of the arc correspond to different test angles, and the luminance values of light may be measured at an interval of same angle. For example, taking a measurement position corresponding to the center of the display panel as 0° and a basis, the luminance meter may be moved counterclockwise within a range of a stereoscopic viewing angle, to measure luminance values of the emitted light at positions corresponding to radian angles of 5°, 10°, 15°, 20°, respectively; and then taking the measurement position corresponding to the center of the display panel as 0° and a basis, the luminance meter may be moved clockwise, to measure luminance values of the emitted light at positions corresponding to radian angles of −5°, −10°, −15°, −20°, respectively. The measurement of the luminance values at an interval of 5° is only an example, and not limited thereto in the embodiment of the present disclosure. The interval angle may be set flexibly according to actual needs by those skilled in the art. In specific implementation process, luminance values may be measured once at an interval of a smaller angle, for example, the luminance values of light may be measured at a step length of 0.5 or 1 degree.

The luminance values at different test angles obtained in steps S101 and S102 are stored in the luminance meter.

Optionally, in order to more easily obtain luminance peaks in the first luminance values corresponding to the respective viewpoint images, luminance distribution curves of first luminance values corresponding to the respective viewpoint images varying with test angles are obtained respectively; the luminance distribution curves corresponding to the respective viewpoint images are superimposed (that is, the luminance distribution curves corresponding to the respective viewpoint images are placed in a same Cartesian coordinate system), the plurality of luminance values corresponding to the respective viewpoint images are obtained in the superimposed luminance distribution curves, and there exist the plurality of luminance peaks in the plurality of luminance values, each of luminance peaks corresponds to a viewing region on the light emitting side of the display panel.

A specific implementation of evaluating crosstalk in the naked-eye stereoscopic display provided by one embodiment of the present disclosure will be described below in detail.

Referring to FIG. 2, a display panel includes a plurality of sub-pixels distributed as a matrix. Description will be given by taking a display panel having four viewpoint images as an example. As shown in FIG. 2, the display panel includes four sets of sub-pixels configured to display four corresponding viewpoint images, i.e., a first set of sub-pixels 1, a second set of sub-pixels 2, a third set of sub-pixels 3 and a fourth set of sub-pixels 4. It should be noted that an arrangement of the respective sub-pixels is not limited to that as shown in FIG. 2.

The display panel is controlled to display each of the viewpoint images, respectively. When a certain viewpoint image is displayed, sub-pixels corresponding to the viewpoint image display white images, while sub-pixels corresponding to other viewpoint images display black images. For example, referring to FIG. 3, when the first viewpoint image is displayed, the first set of sub-pixels 1 of the display panel is controlled to display white images, other sub-pixels display black images.

Figure 4:
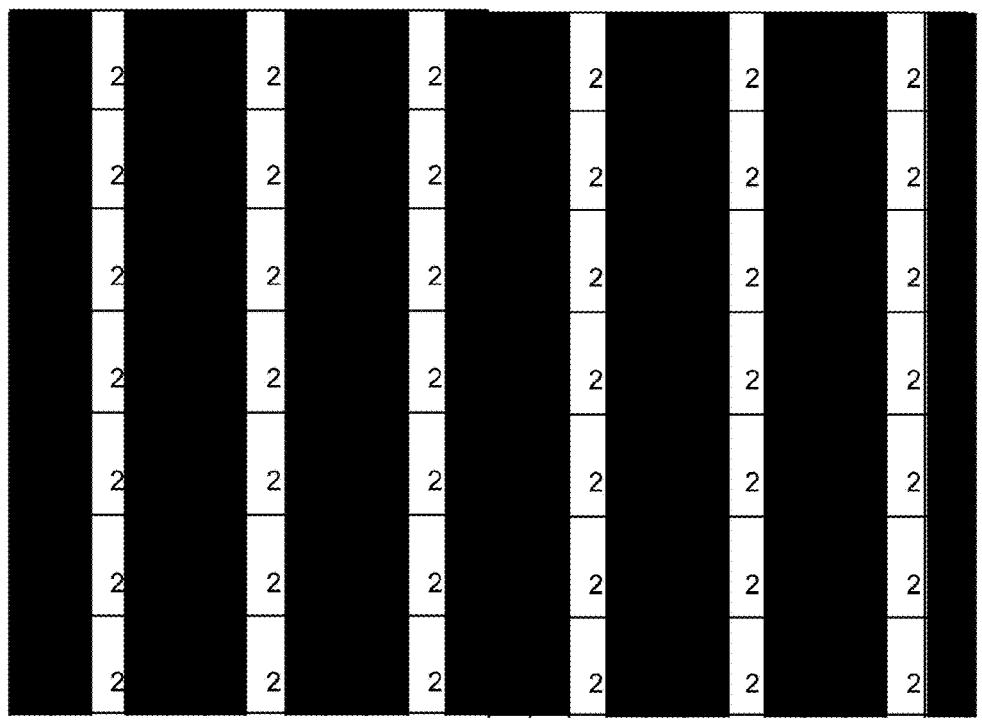
FIG. 4 is a schematic diagram showing an arrangement of a second set of sub-pixels when displaying a corresponding second viewpoint image according to one embodiment of the present disclosure.

Referring to FIG. 4, when the second viewpoint image is displayed, the second set of sub-pixels 2 of the display panel is controlled to display white images, other sub-pixels display black images.

Figure 5:
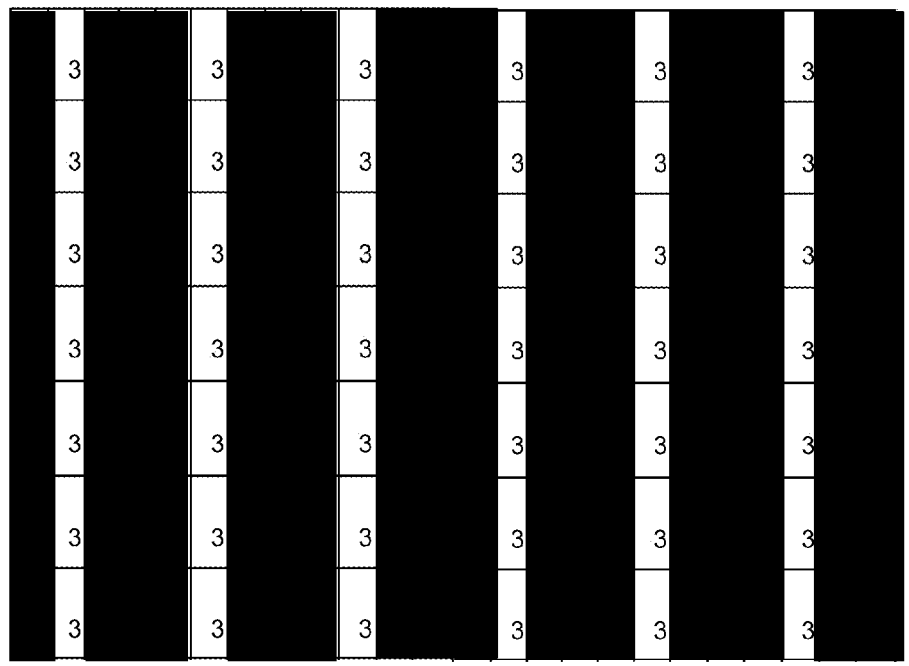
FIG. 5 is a schematic diagram showing an arrangement of a third set of sub-pixels when displaying a corresponding third viewpoint image according to one embodiment of the present disclosure.

Referring to FIG. 5, when the third viewpoint image is displayed, the third set of sub-pixels 3 of the display panel is controlled to display white images, other sub-pixels display black images.

Figure 6:
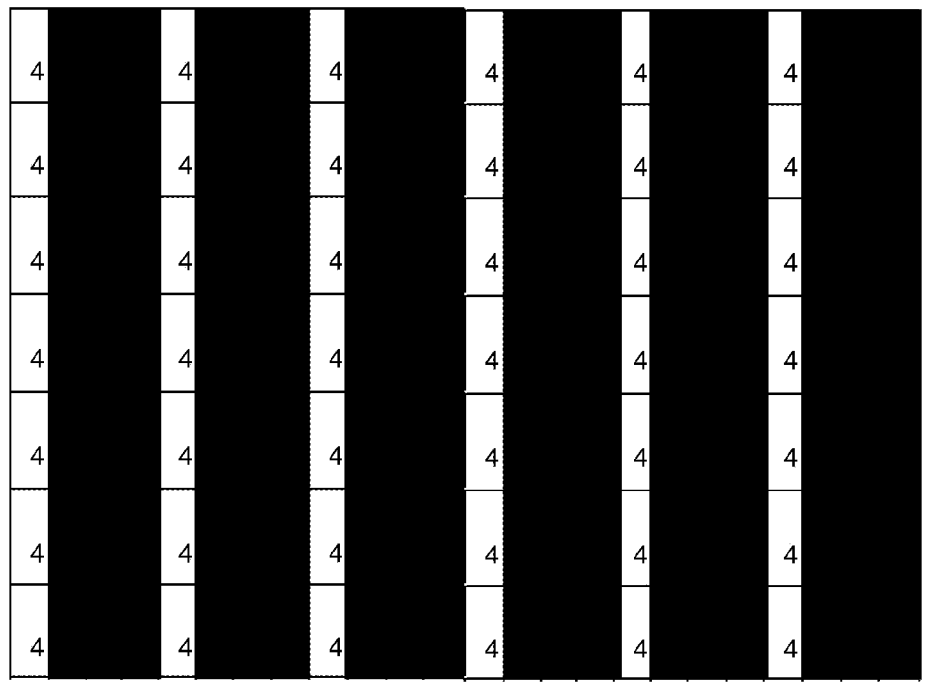
FIG. 6 is a schematic diagram showing an arrangement of a fourth set of sub-pixels when displaying a corresponding fourth viewpoint image according to one embodiment of the present disclosure.

Referring to FIG. 6, when the fourth viewpoint image is displayed, the fourth set of sub-pixels 4 of the display panel is controlled to display white images, other sub-pixels display black images.

Figure 7:
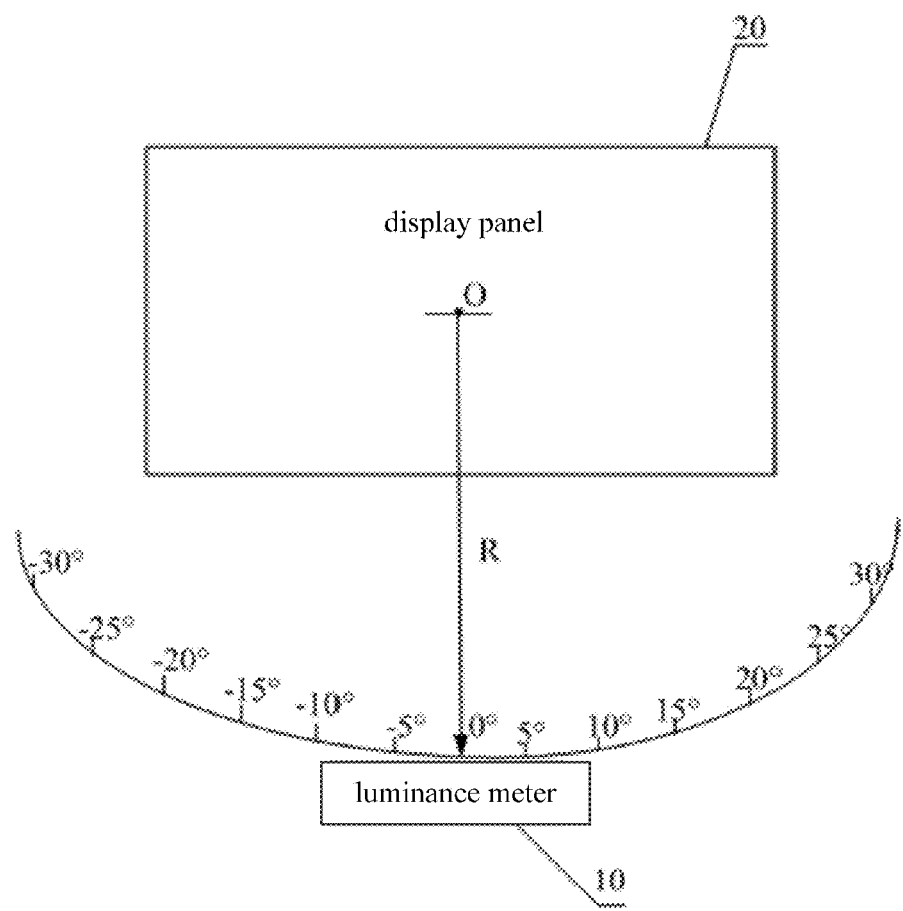
FIG. 7 is a schematic diagram showing a relative position between a luminance meter and a display panel according to one embodiment of the present disclosure.

Referring to FIG. 7, a relative position between the luminance meter 10 and the display panel 20 when the first luminance values and the second luminance values are measured is shown. The luminance meter 10 is moved between different positions on the arc which takes the center O of the display panel 20 as its circle center and takes an optimum viewing distance R from a viewer of watching images as its radius, to measure luminance values of light. For example, luminance values may be sequentially measured at an interval of an angle of 5° in a range of −30° to 30°, and therefore with respect to each of the viewpoint images, 13 luminance values may be sequentially measured at 13 test angles (−30°, −25°, −20°, −10°, −5°, 0°, 5°, 10°, 15°, 20°, 25°, 30°).

Figure 3:
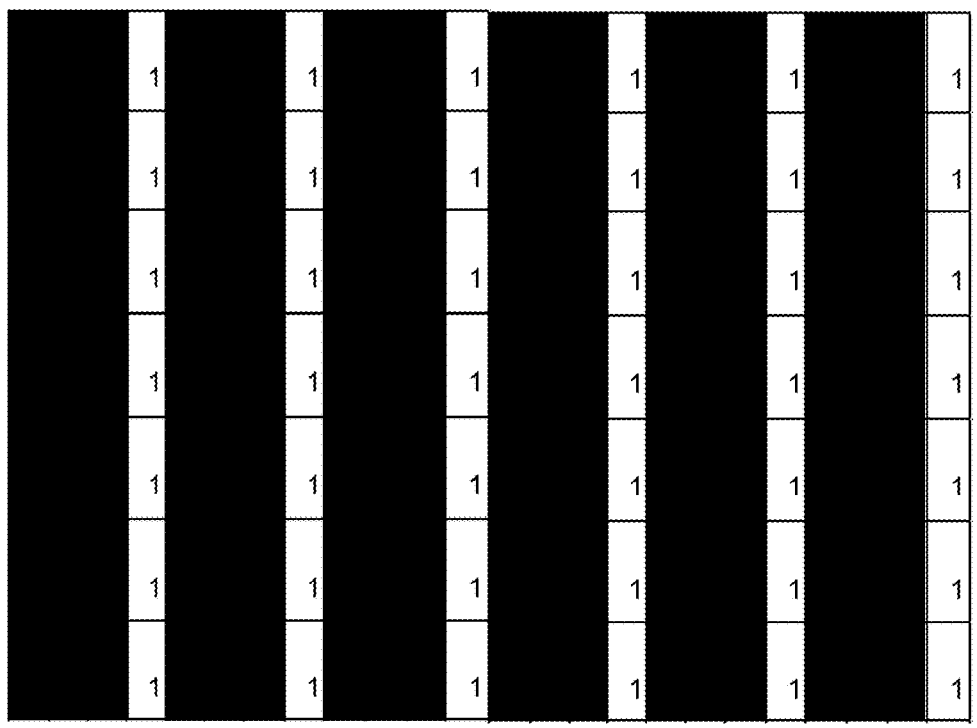
FIG. 3 is a schematic diagram showing an arrangement of a first set of sub-pixels when displaying a corresponding first viewpoint image according to one embodiment of the present disclosure.

A method for evaluating crosstalk in the naked-eye stereoscopic display provided by one embodiment of the present disclosure includes the following steps:

Step S11: obtaining the first luminance values of light at different test angles of the first viewpoint image. For example, the first luminance values $Y_{1i}$, i=1, 2, 3, . . . , 13, at different test angles corresponding to the first viewpoint image as shown in FIG. 3 are measured sequentially by the luminance meter at the interval of an angle of 5° in the range of −30° to 30°.

Specifically, a lens of the luminance meter is faced on the point O at the center of display panel screen. With respect to the image shown in FIG. 3, luminance values are measured at an interval of an angle of 5° in the range of −30° to 30° shown in FIG. 7, and 13 times in total of measurement is made. The obtained luminance values are recorded as $Y_{11}$, $Y_{12}$ . . . $Y_{1i}$ . . . $Y_{113}$ sequentially in accordance with an order of increased test angles, $Y_{1i}$ is the luminance value of light measured at the i-th test angle when the first viewpoint image is displayed. These luminance values are the first luminance values. The first luminance values measured at the respective test angles and the corresponding relationship between the first luminance values and the test angles are stored.

Step S12: obtaining the first luminance values of light at different test angles of the second viewpoint image. For example, the first luminance values $Y_{2i}$, i=1, 2, 3, . . . , 13, at different test angles corresponding to the second viewpoint image as shown in FIG. 4 are measured sequentially by the luminance meter at the interval of an angle of 5° in the range of −30° to 30°.

Specifically, the lens of the luminance meter is faced on the point O at the center of display panel screen. Luminance values are measured at an interval of an angle of 5° in the range of −30° to 30° shown in FIG. 7, and 13 times in total of measurement is made. The obtained luminance values are recorded as $Y_{21}$, $Y_{22}$ . . . $Y_{2i}$ . . . $Y_{213}$ sequentially in accordance with an order of increased test angles; these luminance values are the first luminance values. The first luminance values measured at the respective test angles and the corresponding relationship between the first luminance values and the test angles are stored.

Step S13: obtaining the first luminance values of light at different test angles of the third viewpoint image. For example, the first luminance values $Y_{3i}$, i=1, 2, 3, . . . , 13, at different test angles corresponding to the third viewpoint image as shown in FIG. 5 are measured sequentially by the luminance meter at the interval of an angle of 5° in the range of −30° to 30°.

Specifically, the lens of the luminance meter is faced on the point O at the center of display panel screen. Luminance values are measured at an interval of an angle of 5° in the range of −30° to 30° shown in FIG. 7, and 13 times in total of measurement is made. The obtained luminance values are recorded as $Y_{31}$, $Y_{32}$ ... $Y_{3i}$ ... $Y_{313}$ sequentially in accordance with an order of increased test angles; these luminance values are the first luminance values. The first luminance values measured at the respective test angles and the corresponding relationship between the first luminance values and the test angles are stored.

Step S14: obtaining the first luminance values of light at different test angles of the fourth viewpoint image. For example, the first luminance values $Y_{4i}$, i=1, 2, 3, . . . , 13, at different test angles corresponding to the fourth viewpoint image as shown in FIG. 6 are measured sequentially by the luminance meter at the interval of an angle of 5° in the range of −30° to 30°.

Specifically, the lens of the luminance meter is faced on the point O at the center of display panel screen. Luminance values are measured at an interval of an angle of 5° in the range of −30° to 30° shown in FIG. 7, and 13 times in total of measurement is made. The obtained luminance values are recorded as $Y_{41}$, $Y_{42}$ ... $Y_{4i}$ ... $Y_{413}$ sequentially in accordance with an order of increased test angles; these luminance values are the first luminance values. The first luminance values measured at the respective test angles and the corresponding relationship between the first luminance values and the test angles are stored.

Step S15: obtaining second luminance values of light at different test angles of the all-black image. For example, the second luminance values $M_i$, i=1, 2, 3 ... 13 (i.e., $M_1$, $M_2$, $M_3$, $M_4$ ... $M_{13}$) of light at different test angles corresponding to the all-black image are measured sequentially by the luminance meter at the interval of an angle of 5° in the range of −30° to 30°.

Figure 8:
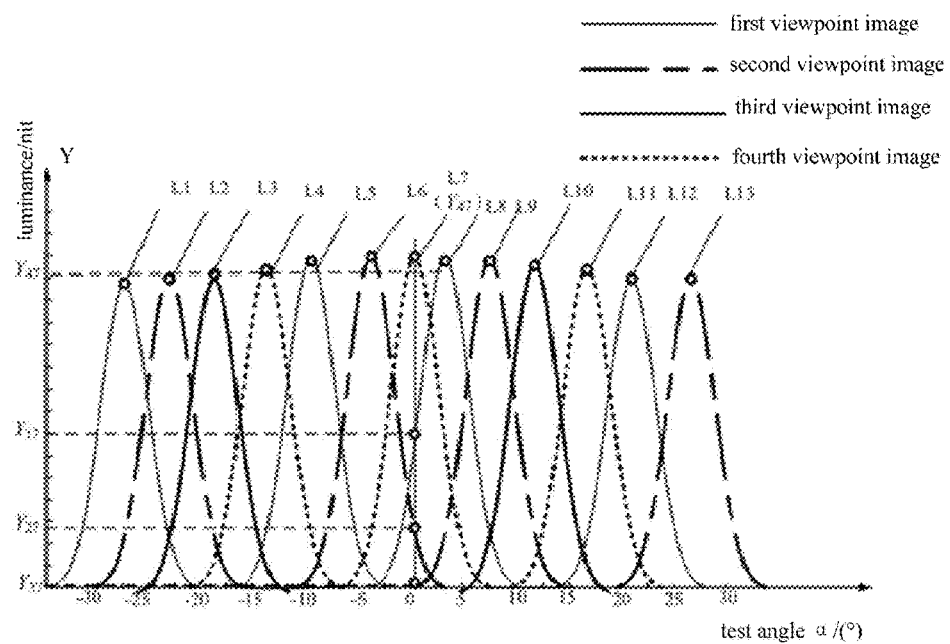
FIG. 8 is a graph showing first luminance of light at different test angles when showing four respective viewpoint images according to one embodiment of the present disclosure.

Step S16: generating a luminance curve of the first luminance values varying with different test angles. For example, as shown in FIG. 8, a distribution curve of the first luminance values varying with test angles is generated according to first luminance values $Y_{ji}$ (j=1, 2, 3, 4; i=1, 2, 3 ... 13) obtained in the step S11 to step S14 and the corresponding relationship between the first luminance values $Y_{ji}$ and the test angles Specifically, a white luminance distribution curve at different test angles corresponding to first viewpoint image as shown in FIG. 8 is generated, according to the corresponding relationship between the first luminance values $Y_{1i}$ corresponding to first viewpoint image obtained by the luminance meter and test angles $\alpha_1$, $\alpha_2$, $\alpha_3$, ... $\alpha_{13}$;

a white luminance distribution curve at different test angles corresponding to second viewpoint image as shown in FIG. 8 is generated, according to the corresponding relationship between the first luminance values $Y_{2i}$ corresponding to second viewpoint image obtained by the luminance meter and test angles $\alpha_1$, $\alpha_2$, $\alpha_3$, ... $\alpha_{13}$;

a white luminance distribution curve at different test angles corresponding to third viewpoint image as shown in FIG. 8 is generated, according to the corresponding relationship between the first luminance values $Y_{3i}$ corresponding to the third viewpoint image obtained by the luminance meter and the test angles $\alpha_1$, $\alpha_2$, $\alpha_3$, ... $\alpha_{13}$;

a white luminance distribution curve at different test angles corresponding to the fourth viewpoint image as shown in FIG. 8 is generated, according to the corresponding relationship between the first luminance values $Y_{4i}$ corresponding to the fourth viewpoint image obtained by the luminance meter and test angles $\alpha_1$, $\alpha_2$, $\alpha_3$, ... $\alpha_{13}$.

Figure 9:
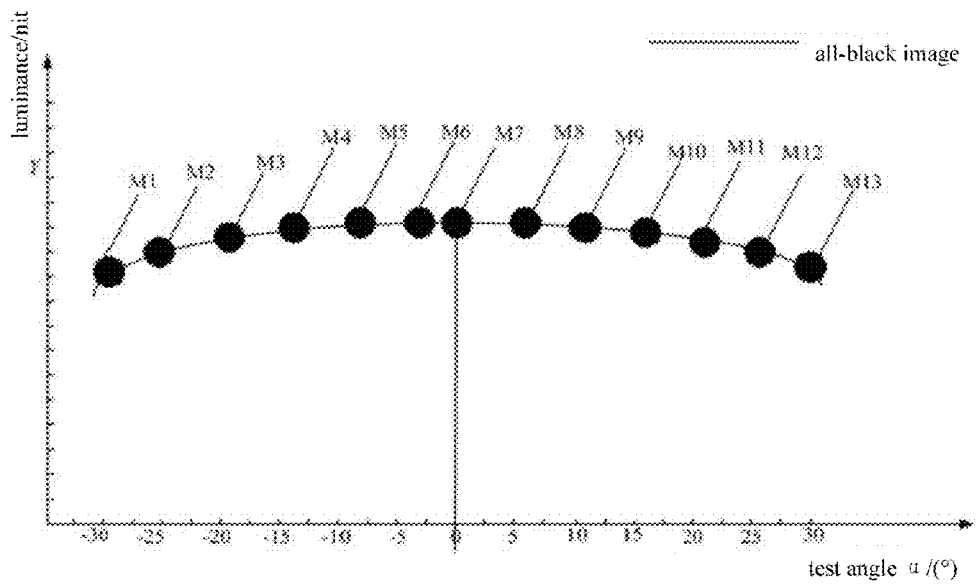
FIG. 9 is a graph showing a relationship between second luminance at different test angles and the test angles when displaying an all-black image according to one embodiment of the present disclosure.

Step S17: generating a luminance curve of the second luminance values varying with different test angles. For example, as shown in FIG. 9, a distribution curve of the second luminance values varying with the test angles is generated according to the second luminance values $M_i$ (i=1, 2, 3 ... 13) obtained in the step S15 and the corresponding relationship between the respective second luminance values $M_i$ and the test angles.

Step S18: determining luminance peaks in the first luminance values. For example, determining luminance peaks of the respective viewpoint images at different test angles in the white luminance distribution curve corresponding to the respective viewpoint images as shown in FIG. 8, determining the plurality of luminance peaks of the respective viewpoint images at the plurality of optimum viewing angles on the light emitting side of the display panel. For example, within a range of −30° to 30°, the respective first luminance peaks correspond to $L_1$, $L_2$, $L_3$, $L_4$, $L_5$, $L_6$ ... $L_{12}$, $L_{13}$ on the longitudinal coordinate.

Step S19: determining second luminance peaks at points of the respective first luminance values. For example, second luminance values at the respective first luminance peaks are determined, and the second luminance values are $M_1$, $M_2$, $M_3$, $M_4$, $M_5$, $M_6$ ... $M_{12}$, $M_{13}$.

Step S20: determining crosstalk values of light at test angles corresponding to the luminance peaks. In accordance with the first luminance values $Y_{ji}$ (j=1, 2, 3, 4; i=1, 2, 3 ... 13) of the respective viewpoint images at the i-th test angle and the second luminance value $M_i$, crosstalk values of light at each optimum viewing angles may be determined by the following formula:

$$PCT_i = \frac{\sum_{j=1}^{N}(Y_{ji} - M_i) - (L_i - M_i)}{L_i - M_i} \times 100\%;$$

after deformation the formula is as follows:

$$PCT_i = \frac{\sum_{j=1}^{N}Y_{ji} - L_i - (N-1)M_i}{L_i - M_i} \times 100\%,$$

where, $$\sum_{j=1}^{N}(Y_{ji} - M_i) - (L_i - M_i)$$

represents a sum of differences between the first luminance values of the respective viewpoint images except for the viewpoint image corresponding to the first luminance peak at the i-th test angle and the second luminance value at the i-th test angle.

Supposing that the seventh test angle is one of the optimum viewing angles. Description will be given by taking determining a crosstalk value $PCT_7$ of light at the seventh test angle ($\alpha$=0) as an example.

Specifically, as shown in FIG. 8, a first luminance value $Y_{47}$ of the fourth viewpoint image at $\alpha$=0 is a luminance peak $L_7$ at $\alpha$=0, that is, $Y_{47}=L_7$, N=4.

$$PCT_7 = \frac{\sum_{j=1}^{4} Y_{j7} - L_7 - (N-1)M_7}{L_7 - M_7} \times 100\% =$$

$$\frac{(Y_{17} + Y_{27} + Y_{37} + Y_{47}) - L_7 - 3M_7}{L_7 - M_7} \times 100\% =$$

$$\frac{(Y_{17} + Y_{27} + Y_{37} + Y_{47}) - Y_{47} - 3M_7}{L_7 - M_7} \times 100\% =$$

$$\frac{Y_{17} + Y_{27} + Y_{37} - 3M_7}{Y_{47} - M_7} \times 100\%$$

Figure 10:
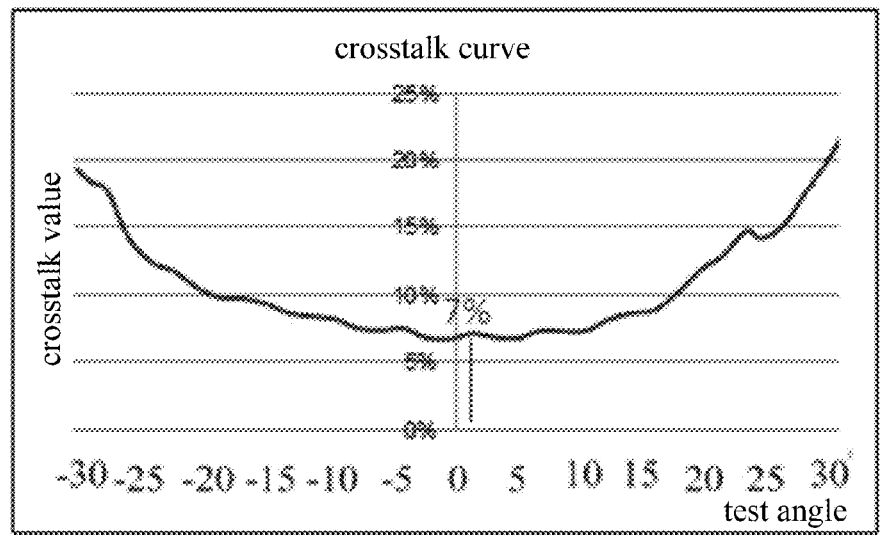
FIG. 10 is a graph showing crosstalk values at different test angles according to one embodiment of the present disclosure.

Further, as shown in FIG. 10, a distribution curve of the respective crosstalk values varying with test angles is generated, according to calculated crosstalk values at the respective test angles. According to the curve shown in FIG. 10, a crosstalk situation of light on the display screen may be determined as a whole.

Figure 11:
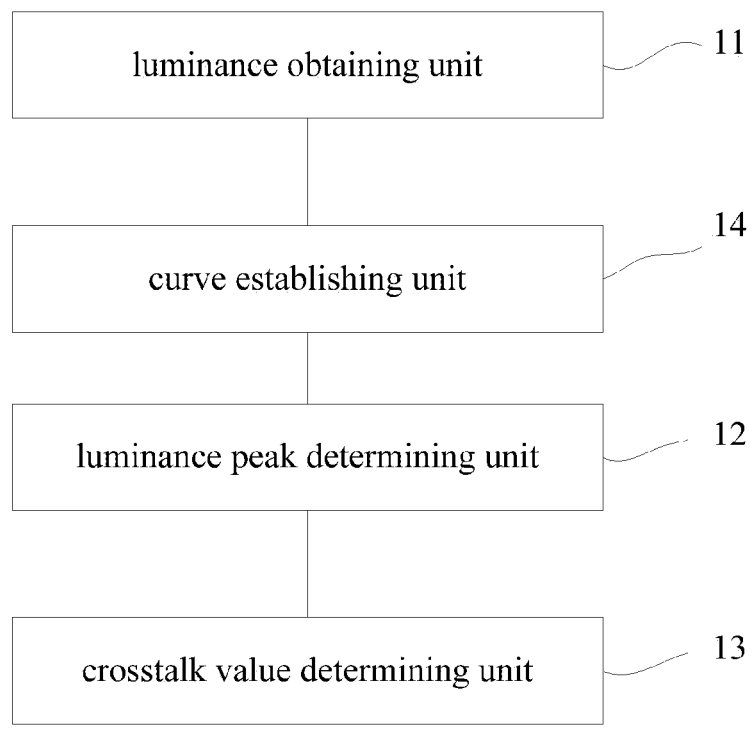
FIG. 11 is a schematic diagram showing a structure of a device for evaluating crosstalk in a naked-eye stereoscopic display according to one embodiment of the present disclosure.

Referring to FIG. 11, one embodiment of the present disclosure also provides a device for evaluating crosstalk in a naked-eye stereoscopic display, including:

a luminance obtaining unit 11, configured to, when each of N viewpoint images is displayed sequentially on a display panel, obtain sequentially first luminance values of light at respective test angles and corresponding to a current viewpoint image, on a light emitting side of the display panel; and, when an all-black image is displayed on the display panel, obtain sequentially second luminance values of light at the respective test angles, on the light emitting side of the display panel; N being a positive integer not less than 2;

a luminance peak determining unit 12, configured to determine luminance peaks in all the obtained first luminance values;

a crosstalk value determining unit 13, configured to determine a crosstalk value of light at any one of the test angles, according to the first luminance values and the second luminance values corresponding to the N viewpoint images at the one of the test angles.

Optionally, the luminance obtaining unit 11 is specifically configured to, at the respective test angles, obtain first luminance values of light emitted by respective sub-pixels used to display the current viewpoint image, on an arc which takes a center of the display panel as its circle center and takes a set distance as its radius and which is located on a same horizontal plane on the light emitting side of the display panel.

Optionally, the device further includes a curve establishing unit 14, configured to establish a first luminance curve according to the obtained first luminance values of light of the respective viewpoint images at the respective test angles; establish a second luminance curve according to the second luminance values of light obtained respectively at the respective test angles.

Optionally, the crosstalk value determining unit 13 is specifically configured to determine a crosstalk value of light at the i-th test angle according to the following formula:

$$PCT_i = \frac{\sum_{j=1}^{N} Y_{ji} - L_i - (N-1)M_i}{L_i - M_i} \times 100\%;$$

where, $PCT_i$ is the crosstalk value of light at the i-th test angle on the display panel; $L_i$ is the luminance peak in the first luminance values corresponding to the respective viewpoint images at the i-th test angle; $M_i$ is the second luminance value at the i-th test angle; $Y_{ji}$ is the first luminance value of the j-th viewpoint image at the i-th test angle; N is the total number of the viewpoint images.

Optionally, the curve establishing unit 14 is further configured to establish a curve of crosstalk values varying with the test angles, according to crosstalk values of light at test angles corresponding to the respective luminance peaks, after determining crosstalk values of light corresponding to all the luminance peaks at test angles.

One embodiment of the present disclosure provides a method for evaluating crosstalk in a naked-eye stereoscopic display, including: when displaying each of the viewpoint images, each of the sub-pixels for displaying the current viewpoint image displays a white image, each of the sub-pixels for displaying other viewpoint images displays a black image; obtaining sequentially, on the light emitting side of the display panel, first luminance values of light at respective test angles and corresponding to the current viewpoint image; controlling the display panel to display an all-black image, obtaining sequentially, on the light emitting side of the display panel, second luminance values of light at respective test angles; determining a crosstalk value of light at a test angle corresponding to any one luminance peak in the first luminance values, according to the one luminance peak and a second luminance value at the same test angle corresponding to the one luminance peak. N is a positive integer not less than 2. By determining first luminance values of the all-white image and second luminance values of the all-black image, the crosstalk value in the naked-eye 3D display is measured accurately, so that crosstalk degrees in the naked-eye 3D display may be objectively and accurately evaluated.

Apparently, those skilled in the art may make various modifications and variations to the present disclosure without departing from the spirit and scope of the present disclosure. Thus, if those modifications and variations of the present disclosure are fallen within the scope of the claims of the present disclosure and their equivalent arts, the present disclosure is also intended to include these modifications and variations.

What is claimed is:

1. A method for evaluating crosstalk in a naked-eye stereoscopic display, comprising:

displaying each of N viewpoint images sequentially by displaying a white image at sub-pixels for displaying a current viewpoint image and displaying a black image at sub-pixels for displaying viewpoint images other than the current viewpoint image;

obtaining sequentially, on a light emitting side of a display panel, corresponding first luminance values of light at respective test angles when displaying the current viewpoint image, and determining luminance peaks in all of the obtained first luminance values;

controlling the display panel to display an all-black image, and obtaining sequentially, on the light emitting side of the display panel, corresponding second luminance values of light at the respective test angles when displaying the all-black image;

determining the second luminance value at the test angle corresponding to any one of the luminance peaks; and determining a crosstalk value of light at the test angle corresponding to the any one of the luminance peaks in the first luminance values, according to the any one of the luminance peaks and the second luminance value at the test angle corresponding to the any one of the luminance peaks, wherein N is a positive integer not less than 2, wherein the obtaining sequentially, on a light emitting side of the display panel, corresponding first luminance values of light at respective test angles when displaying a current view point image, comprises:

at the respective test angles, obtaining first luminance values of light emitted by the respective sub-pixels for displaying the current viewpoint image, on an arc which takes a center of the display panel as its circle center and takes a set distance as its radius and which is located on a same horizontal plane on the light emitting side of the display panel, wherein the determining a crosstalk value of light at the test angle corresponding to the any one of the luminance peaks in the first luminance values, according to the any one of the luminance peaks and the second luminance value at the test angle corresponding to the any one of the luminance peaks, comprises:

determining a crosstalk value of light at an i-th test angle according to a formula:

$$PCT_i = \frac{\sum_{j=1}^{N} Y_{ji} - L_i - (N-1)M_i}{L_i - M_i} \times 100\%;$$

wherein, $PCT_i$ is the crosstalk value of light at the i-th test angle on the display panel; $L_i$ is the luminance peak in the first luminance values corresponding to the respective viewpoint images at the i-th test angle; $M_i$ is the second luminance value at the i-th test angle; $Y_{ji}$ is the first luminance value of a j-th viewpoint image at the i-th test angle; N is a total number of the viewpoint images.

2. The method according to claim 1, wherein the first luminance values and the second luminance values of light at the respective test angles are obtained by:

establishing a first luminance curve according to the first luminance values of light obtained at the respective test angles when the display panel displays the respective viewpoint images; and establishing a second luminance curve according to the second luminance values of light obtained at the respective test angles when the display panel displays the all-black image.

3. The method according to claim 1, wherein after the determining a crosstalk value of light at the test angle corresponding to the any one of the luminance peaks, the method further comprises:

establishing a curve of crosstalk values varying with the test angles, according to crosstalk values of light at test angles corresponding to the respective luminance peaks.

4. The method according to claim 1, wherein the first luminance values and the second luminance values of light at the respective test angles are obtained on the arc at an interval of a set angle.

5. A device for evaluating crosstalk in a naked-eye stereoscopic display, comprising:

a controller configured to, when each of N viewpoint images is displayed sequentially on a display panel, obtain sequentially, on a light emitting side of the display panel, corresponding first luminance values of light at respective test angles when displaying a current viewpoint image; and when an all-black image is displayed on the display panel, obtain sequentially, on the light emitting side of the display panel, corresponding second luminance values of light at the respective test angles when displaying the all-black image, wherein N is a positive integer not less than 2;

the controller being further configured to determine luminance peaks in all the obtained first luminance values;

wherein the controller is further configured to determine the second luminance value at the test angle corresponding to any one of the luminance peaks and determine a crosstalk value of light at the test angle corresponding to the any one of the luminance peaks in the first luminance values, according to the any one of the luminance peaks and the second luminance value at the test angle corresponding to the any one of the luminance peaks;

wherein the controller is further configured to, at the respective test angles, obtain first luminance values of light emitted by respective sub-pixels for displaying the current viewpoint image, on an arc which takes a center of the display panel as its circle center and takes a set distance as its radius and which is located on a same horizontal plane on the light emitting side of the display panel; and wherein the controller is configured to determine a crosstalk value of light at an i-th test angle according to a formula:

$$PCT_i = \frac{\sum_{j=1}^{N} Y_{ji} - L_i - (N-1)M_i}{L_i - M_i} \times 100\%;$$

wherein, $PCT_i$ is the crosstalk value of light at the i-th test angle on the display panel; $L_i$ is the luminance peak in the first luminance values corresponding to the respective viewpoint images at the i-th test angle; $M_i$ is the second luminance value at the i-th test angle; $Y_{ji}$ is the first luminance value of a j-th viewpoint image at the i-th test angle; N is a total number of the viewpoint images.

6. The device according to claim 5, wherein the controller is further configured to:

establish a first luminance curve according to the first luminance values of light obtained at the respective test angles when the display panel displays the respective viewpoint images; and establish a second luminance curve according to the second luminance values of light obtained at the respective test angles when the display panel displays the all-black image.

7. The device according to claim 5, wherein the controller is further configured to, after determining the crosstalk value of light at the test angle corresponding to the any one of the luminance peaks, establish a curve of the crosstalk values varying with the test angles, according to the crosstalk values of light at the test angles corresponding to the respective luminance peaks.

8. The device according to claim 5, wherein the controller obtains the first luminance values and the second luminance values of light at the respective test angles on the arc at an interval of a set angle.

9. A method for evaluating crosstalk in a naked-eye stereoscopic display, comprising steps of:
- when displaying each of N viewpoint images, each of sub-pixels for displaying a current viewpoint image displays a white image, each of sub-pixels for displaying other viewpoint images displays a black image, wherein N is a positive integer not less than 2;
- obtaining sequentially, on a light emitting side of a display panel, corresponding first luminance values of light at respective test angles when displaying the current viewpoint image, and determining luminance peaks in all of the obtained first luminance values;
- controlling the display panel to display an all-black image, obtaining sequentially, on the light emitting side of the display panel, corresponding second luminance values of light at the respective test angles when displaying the all-black image; and
- determining a crosstalk value of light at one test angle corresponding to any one of the luminance peaks in the first luminance values, according to the one of the luminance peaks and one second luminance value at the same test angle corresponding to the one of the luminance peaks;
- wherein the obtaining sequentially, on a light emitting side of the display panel, corresponding first luminance values of light at respective test angles when displaying a current viewpoint image, includes:
- at the respective test angles, obtaining first luminance values of light emitted by the respective sub-pixels for displaying the current viewpoint image, on an arc which takes a center of the display panel as its circle center and takes a set distance as its radius and which is located on a same horizontal plane on the light emitting side of the display panel; and
- wherein the determining a crosstalk value of light at one test angle corresponding to any one of the luminance peaks in the first luminance values, according to the one of the luminance peaks and one second luminance value at the same test angle corresponding to the one of the luminance peaks, includes:
- determining a crosstalk value of light at an i-th test angle according to a formula:

$$PCT_i = \frac{\sum_{j=1}^{N} Y_{ji} - L_i - (N-1)M_i}{L_i - M_i} \times 100\%;$$

where, $PCT_i$ is the crosstalk value of light at the i-th test angle on the display panel; $L_i$ is the luminance peak in the first luminance values corresponding to the respective viewpoint images at the i-th test angle; $M_i$ is the second luminance value at the i-th test angle; $Y_{ji}$ is the first luminance value of a j-th viewpoint image at the i-th test angle; N is a total number of the viewpoint images.

10. The method according to claim 9, wherein after the determining a crosstalk value of light at one test angle corresponding to any one of the luminance peaks, the method further comprises establishing a curve of crosstalk values varying with the test angles, according to crosstalk values of light at test angles corresponding to the respective luminance peaks.

* * * * *